Aug. 28, 1962   J. CLYNE   3,050,805
SNAP FASTENERS
Filed Oct. 9, 1959
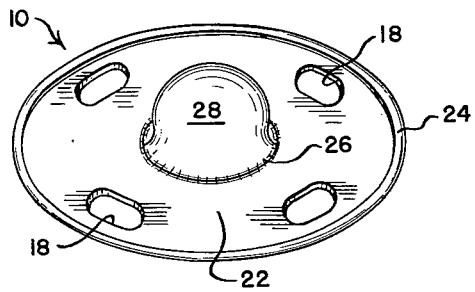
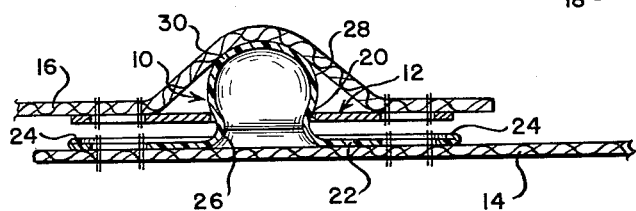
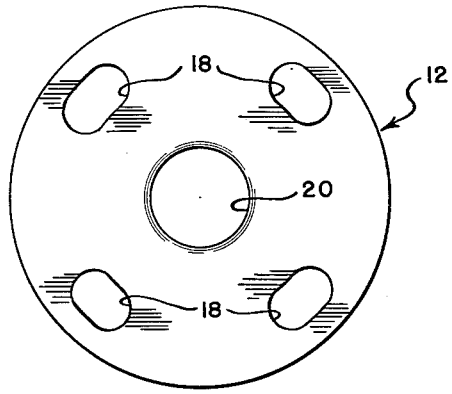
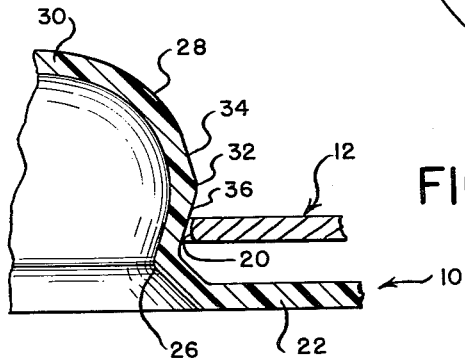
INVENTOR
Joseph Clyne
BY
ATTORNEYS

United States Patent Office 3,050,805
Patented Aug. 28, 1962

3,050,805
SNAP FASTENERS
Joseph Clyne, Bronx, N.Y., assignor to Flexsleev, Inc.,
New York, N.Y., a corporation of New York
Filed Oct. 9, 1959, Ser. No. 845,394
3 Claims. (24—214)

The invention relates to improvements in separable snap fasteners of the type including a male base member having a projecting head cooperating with an opening or socket in a female member, and more particularly to an improved male base member made of resilient plastic material having the characteristics to provide an inherent spring or give and recovery so that it readily cooperates with a simple female member of relatively rigid material having an opening or recess for receiving the head of the male member with a snap action.

Separable snap fasteners as now made and used for attaching elements of clothting together, and for in general attaching two materials together are made of sheet metal in which the male base member has a rigid head, while the female member includes an opening associated with a wire spring or equivalent spring means for holding the head of the male member in the opening. The manufacture of such snap fasteners involves a rather complicated pressing and assembly operation and usually involves the making of at least three parts. Furthermore, in order to make a satisfactory snap fastener of the usual type, the spring material must be of a quality or tempered in such a way that it will be able to function for a reasonable length of time in normal use. Even though conventional snap fasteners might be made on automatic machines, two or more different types of machines must be employed and the cost of manufacture is high. Furthermore, snap fasteners made from sheet metal, at least for some purposes must be lacquered or painted in order to avoid contact of the metal with the body and to avoid corrosion.

The primary object, therefore, of the present invention is to provide a separable snap fastener which may be rapidly manufactured by a relatively simple molding procedure.

A further object of the invention is to provide a male base member for snap fasteners of resilient, pliable or springy plastic material, which will not have the disadvantages of metal snap fasteners and which can be manufactured rapidly and at low cost.

In general the improved separable snap fastener of the present invention comprises a female member such as a flat ring or plate having a circular opening and a cooperating male member having an annular flange and a hollow head integral and projecting from the central portion of one face of the annular flange, to which it is connected by a neck or shank of smaller diameter than the head. In this construction the invention relates particularly to a base member of molded or formed synthetic plastic material of a character to provide a resilient momentarily-deformable head structure adapted to be contracted when forced through the opening in the female member. The head of the male member has a rounded top adapted to seat in the opening of the female member, and this top merges into an annular portion at the maximum diameter of the head, preferably having a special structure, which in turn merges into the neck of smaller diameter than the annular portion. In molding the base member, the annular portion of the head, as referred to, is given an outside diameter somewhat greater than that of the opening in the female member and a structure which is bodily contractible when the head is forced through or snapped into the opening of the female member.

The female member of the separable snap fastener may comprise a simple flat plate having a central opening of a predetermined diameter through which the head of the male member is adapted to snap. This plate, which is in the form of a flat ring or washer type structure, may be provided with marginal openings for use in sewing it to the fabric or other material to which the snap fasteners are attached. The female members may be made of rigid sheet metal or other material or of molded or formed synthetic plastic material of a character such as to provide a slight give or spring during a snap operation.

The male members are made of a synthetic plastic material, preferably thermoplastics, which when formed into the desired shape has the characteristics described herein. Suitable known commercial molding plastics, resins or compositions may be selected and used, such as polyethylenes, synthetic rubbers, combinations of synthetic rubbers and synthetic plastics, and others, it being understood that the invention does not involve the use of a particular molding plastic.

The improved snap fastener of the present invention includes other structural features and characteristics described in detail hereinafter in connection with the accompanying drawings showing one embodiment of the invention.

In the drawings:

FIG. 1 is a central sectional view showing a separable snap fastener according to the invention assembled and attaching two pieces of material together;

FIG. 2 is a perspective view of the molded synthetic plastic male member shown in FIG. 1 constructed and formed in accordance with the invention;

FIG. 3 is a plan view of the female member shown in FIG. 1; and

FIG. 4 is a broken sectional view through a portion of the molded plastic male member illustrated in FIGS. 1 and 2, taken on a larger scale in order to bring out the relationships of certain of the parts or surfaces, according to the invention.

Referring to the drawings, the separable snap fastener of the present invention comprises a male base member 10 and a female member 12 respectively attached to pieces of material 14 and 16, such as the parts of a garment as shown in FIG. 1. The members 10 and 12 may be provided with the usual marginal holes 18, so that they are readily sewed to the parts of the garment, or they may be attached by other known means or procedures. The female member 12, as shown in FIGS. 1 and 3, may merely comprise a flat ring or plate having a central circular opening 20 for receiving the head of the male member. The member 12 may be made of sheet metal or molded from commercial plastic material, so that it is provided with a central opening of fixed diameter.

The male member 10 is an integral molded plastic element having the characteristics referred to above, and includes an annular flange 22, having about the same outside diameter as that of the member 12, and it may be provided with a reinforcing bead 24. At the central portion of the flange 22 a neck 26 extends upwardly and merges into a head 28, which, at its maximum outside diameter, is slightly larger than the opening 20 in the member 12, the head being deformable so that when the spherical-shaped portion 30 at the top of the head is centered in the opening 20, the head may be forced through this opening and then recover its normal diameter to retain the members 10 and 12 in snapped position.

The preferred relationships of the elements of the snap fastener, particularly those of the head and neck structure of the male base member 10, are shown more in detail in FIG. 4, in which the annular position or surface area of maximum diameter 32 is located in a plane substantially parallel to the flange 22. From this position the upper and lower parts of the head 28 on opposite sides of the position 32 of maximum diameter have annular outside surfaces 34 and 36 which slope inwardly at a steep angle to the plane extending through the position of maximum diameter. This angle is advantageously in the range of from about 97° to 94°. The annular surface 34 merges into the outer surface of the spherical-shaped top 30 of the head 28, while the annular surface 36 merges into the neck portion 26 of the member 10, which is of somewhat smaller diameter.

The annular surfaces 34 and 36 of the head of the male member 10 constitute engagement surfaces which are contacted with the edge of the circular opening 20 in the female member 12 when the head is snapped into and from the female member 12. The surfaces 34 and 36 provide annular areas of resistance and pressure involved in the snapping and unsnapping of the elements of the fastener, and because of the steepness of the angle of these annular surfaces, a minimum of force is necessary to effect the snap action, since the force applied normal to the plane of maximum diameter is substantially all transmitted as a horizontal component which compresses the head 28 around its whole area of maximum diameter to deform it sufficiently to permit snap action in both directions. The deformation of the areas 32, 34 and 36 during a snap action flattens in the head at the position of maximum diameter and appears to elongate the head slightly in a direction normal to the position of maximum diameter. It is only necessary to provide a head having a maximum diameter of not more than a few thousandths of an inch greater than that of the diameter of the opening 20 in the female member 12.

The snap action is facilitated if the upper and lower rims of the opening 20 are beveled off at a steep angle so as to provide a somewhat rounded or bead type edge. This type of structure is readily provided in the female member if it is molded from plastic materials to provide a substantially rigid ring structure. Such a structure is shown in FIG. 4, in which the edge of the opening 20 is rounded. This type of structure cooperates with the steep engagement surfaces 34 and 36 to increase the ease with which the head 28 snaps through the opening 20. The molding of the male base member 10 from synthetic plastics producing substantially rigid type molded articles, but which gives a head structure having the springy deformable characteristics referred to above, makes it possible to make uniform head structures which are accurately sized and shaped so that there are few discards.

The male base member 10 may be molded or formed from synthetic plastic molding compositions adapted to give the characteristics referred to herein, by standard molding or forming procedures. Many hollow plastic articles are made by various commercial molding procedures including blow molding and combinations of blow molding and extrusion molding or combinations of injection molding and blow molding with heating. The member 10 may also be formed from plastic sheet material by a known commercial heat and pressure procedure combined with blow molding of the head into a cavity of a two-part mold.

In forming the member 10 by injection molding according to commercial practice, a two-part outside mold is preferably employed, and if a solid mold element is used for the interior of the head, the formed member 10 will be sufficiently flexible around the neck portion so that it can be pushed or blown off the interior head mold element after the two-part mold is released. If the head of the member 10 is formed by blow molding heated sheet plastic into a cavity, the formed and partially cooled element can be snapped out of the cavity by pushing or blowing, while the member is still quite hot.

The term "plastic" as used in the specification and claims is to be understood as a generic term covering the various types of materials referred to made from organic base substances. Furthermore, the phrase "synthetic plastic material" as used in the specification and claims is used in a broad generic sense and is intended to include the types of compositions and materials referred to and other known plastic materials having the property of being formed into the desirable snap fastener shape with a yieldable and recoverable head structure.

What I claim is:

1. A separable snap fastener for joining parts of a garment together, comprising a substantially rigid ring-shaped female member of thin material for attachment to one part of the garment, said ring-shaped female member having a central circular opening of fixed diameter, a male base member for attachment to another part of the garment to be joined to said one part, said male base member cooperating with the female member for separably joining said parts of the garment together, said male base member having an annular flange for attachment to the garment and a hollow head integral with and projecting from the central portion of one face of the annular flange, said head being adapted to be snapped through the opening in the female member, a hollow neck connecting the head and flange and having a smaller diameter than that of the opening in the female member, said male base member being of synthetic plastic material having the characteristics of providing a resilient, momentarily deformable head structure adapted to be contracted when snapped through and withdrawn from the circular opening in the female member and to recover to its normal shape and size, the head of the male base member having a rounded top merging into a circular annular portion at the maximum diameter of the head which in turn merges into the neck, said neck having a smaller diameter than that of the circular annular portion of the head, said circular annular portion of the head having a circular annular area of maximum diameter and steep annular engagement surfaces respectively on opposite sides of its circular annular area of maximum diameter, said maximum diameter being somewhat greater than that of the circular opening of fixed diameter in the female member, and the head being contractible when it is snapped through and withdrawn from said circular opening in the female member.

2. A separable snap fastener as claimed in claim 1, in which the annular engagement surfaces of the head on the respective sides of the portion of maximum diameter slope slightly inwardly from the circular annular portion of maximum diameter at an angle approximating 97° with respect to a plane substantially parallel to the annular flange of the male base member and extending through the head at the position of its maximum diameter.

3. A separable snap fastener as claimed in claim 1, in which the sloping annular engagement surfaces on the respective sides of the circular annular portion of maximum diameter have an inward slope of a few degrees from normal with respect to a plane substantially parallel to the annular flange and extending through the head at the position of its maximum diameter.

References Cited in the file of this patent

UNITED STATES PATENTS

| | | |
|---|---|---|
| 890,608 | Cliff | July 16, 1908 |
| 2,446,661 | Murdock | Aug. 10, 1948 |
| 2,709,290 | Rosenthal | May 31, 1955 |
| 2,838,820 | Hakanson | June 17, 1958 |
| 2,933,794 | Biesecker | Apr. 26, 1960 |

FOREIGN PATENTS

| | | |
|---|---|---|
| 1,051,695 | France | Sept. 16, 1953 |
| 369,166 | Italy | Mar. 14, 1939 |
| 461,669 | Italy | Feb. 8, 1951 |